C. L. PARKER.
VARIABLE PITCH PROPELLER FOR AIRPLANES.
APPLICATION FILED OCT. 19, 1920.

1,386,274.

Patented Aug. 2, 1921.
7 SHEETS—SHEET 3.

WITNESSES
Howard D. Orr
F. T. Chapman

C. L. Parker, INVENTOR,
BY E. G. Siggers
ATTORNEY

UNITED STATES PATENT OFFICE.

CLARENCE LYMAN PARKER, OF LOS ANGELES, CALIFORNIA.

VARIABLE-PITCH PROPELLER FOR AIRPLANES.

1,386,274.   Specification of Letters Patent.   Patented Aug. 2, 1921.

Application filed October 19, 1920. Serial No. 417,915. REISSUED

*To all whom it may concern:*

Be it known that I, CLARENCE L. PARKER, a citizen of the United States, residing at Los Angeles, in the county of Los Angeles and State of California, have invented a new and useful Variable-Pitch Propeller for Airplanes, of which the following is a specification.

This invention has reference to variable pitch propellers for airplanes and its object is to provide a propeller construction permitting adjustment of the pitch of the blade whereby a more rapid "get away" is obtainable than with fixed-pitch blades, the life of the propeller, and of the machine as a whole, is materially prolonged, and the amount of travel on the ground before the machine arises therefrom is much reduced. Moreover, the variable pitch propeller provides for higher and faster climbing and for more rapid traveling forwardly in the air, as well as reduced up-keep.

The adjustment of pitch has a similar effect to the shifting of gears on land vehicles. The variable pitch demands a greater factor of safety than with fixed-pitch blades because greater strains are imposed on the propellers. Moreover, the variable pitch propeller is utilizable as an air brake.

The invention will be best understood from a consideration of the following detailed description taken in connection with the accompanying drawings, forming part of this specification, with the understanding, however, that the invention is not confined to any strict conformity with the showing of the drawings but may be changed and modified so long as such changes and modifications mark no material departure from the salient features of the invention, as expressed in the appended claims.

Figures 1, 2:
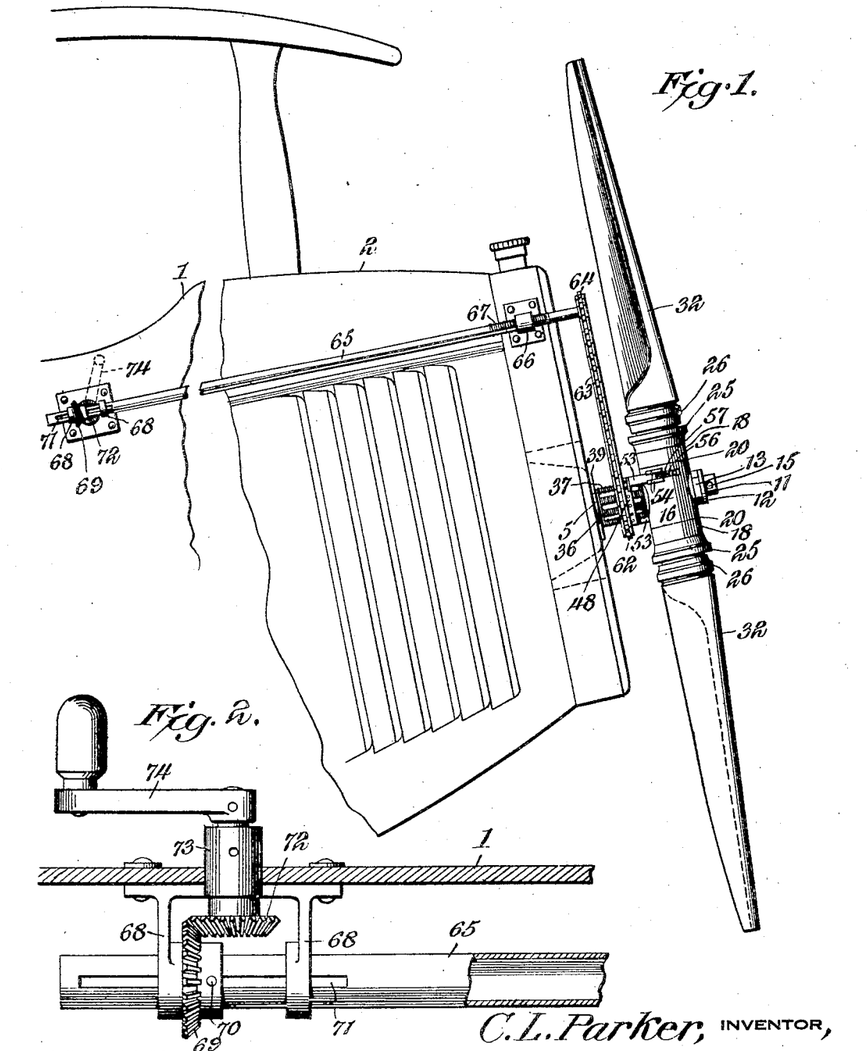
Figure 1 is a side elevation of the forward end of the fuselage, showing the propeller blades.
Fig. 2 is a longitudinal section, partly in elevation, showing controlling means for varying the pitch of the propeller blades.
Figure 3:
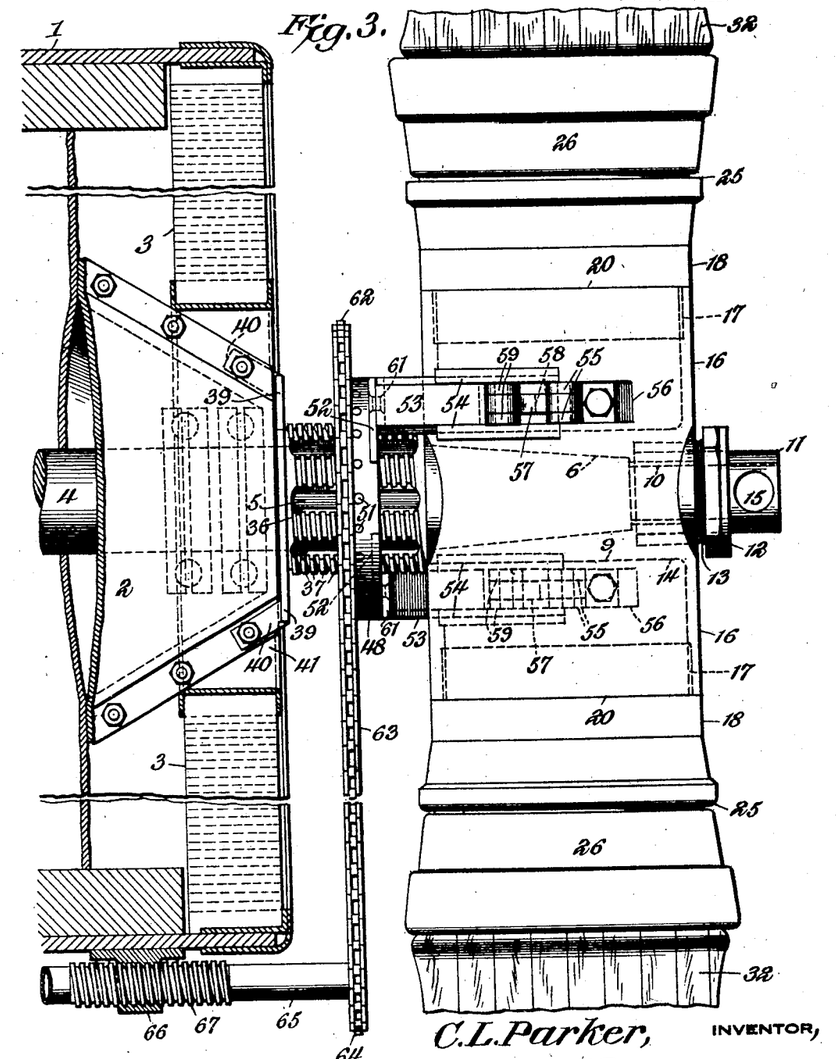
Fig. 3 is a side elevation of the hub portion of the propeller and also showing a section of the radiator at the forward end of the hood.
Figures 4, 5:
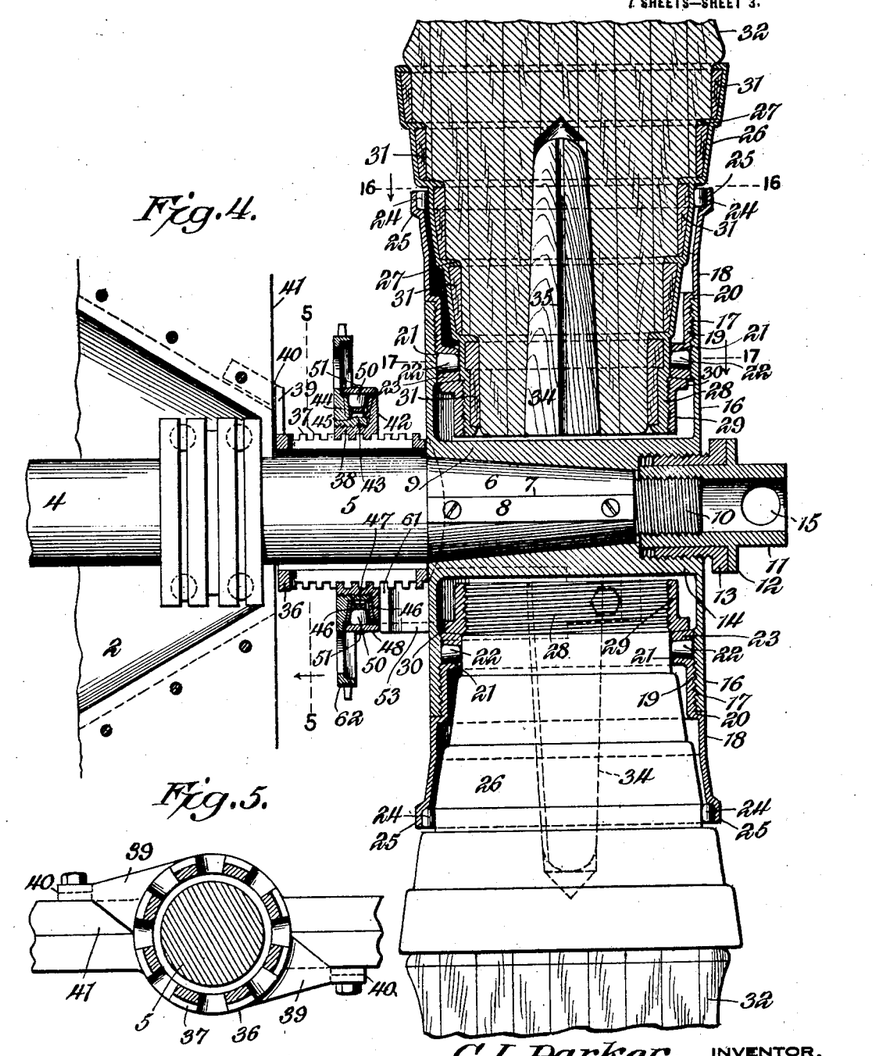
Fig. 4 is a diametric section of the hub portion of the propeller and of the inner end of one blade, with the companion blade shown, in most part, in elevation, and also showing a portion of the means for varying the pitch of the blades.
Fig. 5 is a section on the line 5—5 of the Fig. 4.
Figure 6:
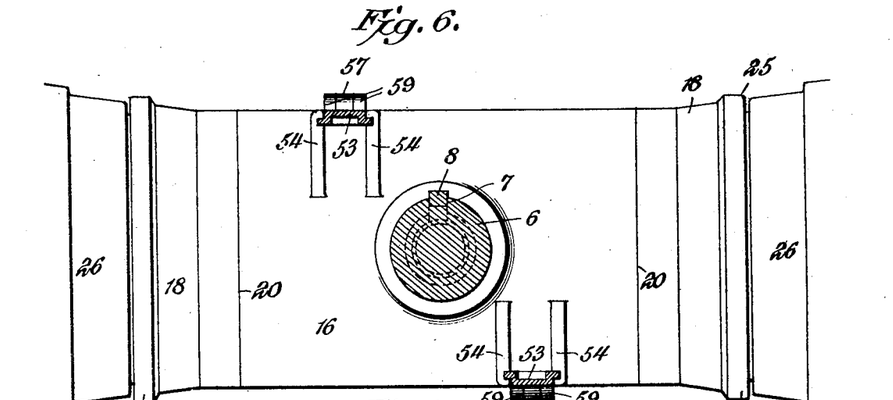
Fig. 6 is an elevation of the socket portion of the propeller with parts in cross section.

Referring to the drawings, there is shown in Fig. 1, and there also appears, in some part, in Figs. 3 and 4, an airplane fuselage 1, or body 1, carrying at the forward end an engine cover 2 and a radiator 3, all of which may be of customary construction and, hence, require no special description. No attempt is made to show the airplane engine, but in certain of the figures there is shown an engine drive shaft 4.

The shaft 4 is extended forwardly through the body portion and beyond the latter, and is there provided with a portion 5, which may be of even diameter and terminates in a taper extremity 6, having a key-seat 7 for the reception of a spline 8 partially seated in the forward projection or extremity 6 of the shaft 4 of the engine, and partially seated in a hub 9 surrounding the shaft 4, so that the shaft and the hub 9 are firmly connected together.

The taper extremity 6 of the shaft 4 has a terminal screw stem 10 to which there is applied a tubular nut 11, provided with an intermediate circumferential flange 12. Applied to the exterior of the nut 11 is a jam nut 13 entering a screw socket 14 in the outer end of the hub 9, this forming a close fit of the hub on the extension or spindle 6 of the shaft 4. Near the outer end the sleeve 11 is traversed by matching holes 15, permitting the introduction of a rod or bar to effectively screw the sleeve 11 into place, where the sleeve may be locked by the application of a suitable tool to the locknut 13.

Figure 7:
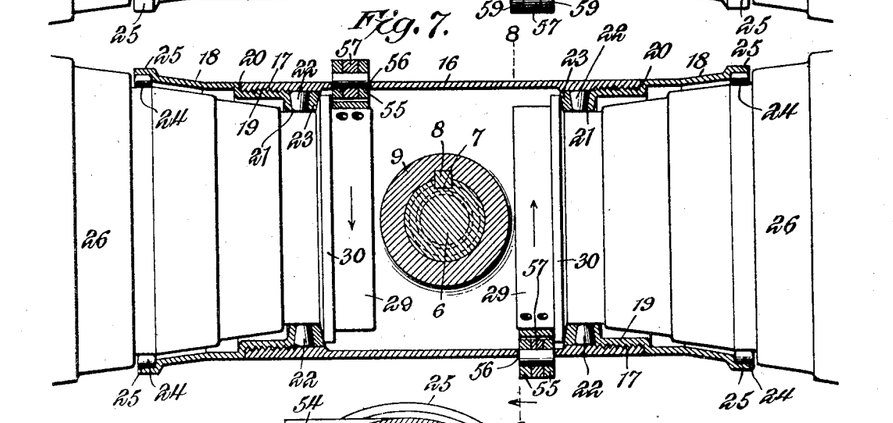
Fig. 7 is a section of the hub portion of the propeller with the propeller blades in elevation.
Figure 8:
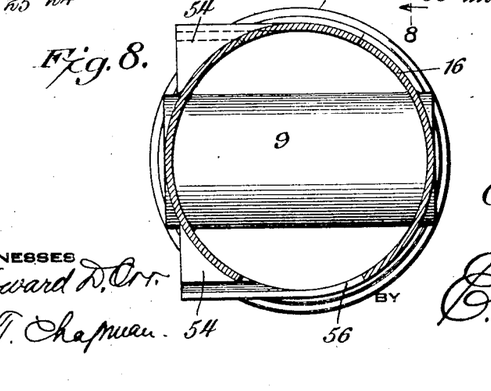
Fig. 8 is a section on the line 8—8 of Fig. 7.
Figure 9:
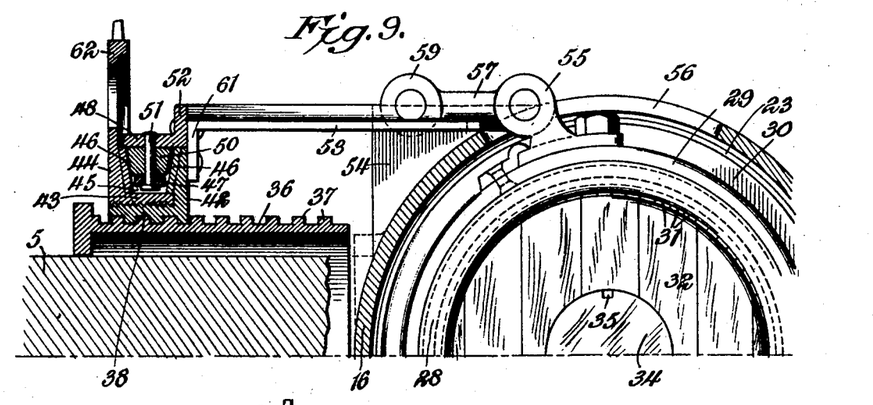
Fig. 9 is a section longitudinally through the power shaft and transversely through the hub to one side of the longitudinal axis thereof, the section showing an elevation of the inner end of one of the propeller blades or wings with the adjusting means for the blade at one limit of travel.
Figure 10:
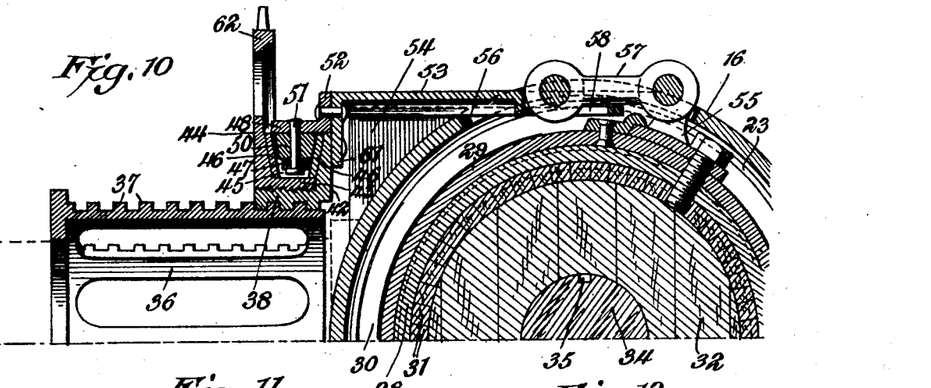
Fig. 10 is a view similar to Fig. 9, with the section through the hub such as to traverse the end of the corresponding propeller blade and showing the adjusting means for the propeller blade at the other end of its travel.
Figure 11:
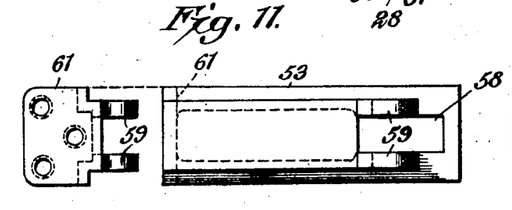
Fig. 11 is an end and side view of the bracket structure shown in Figs. 9 and 10.
Figure 12:
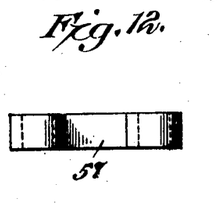
Fig. 12 is a plan view of a link structure shown in Figs. 9 and 10.
Figure 13:
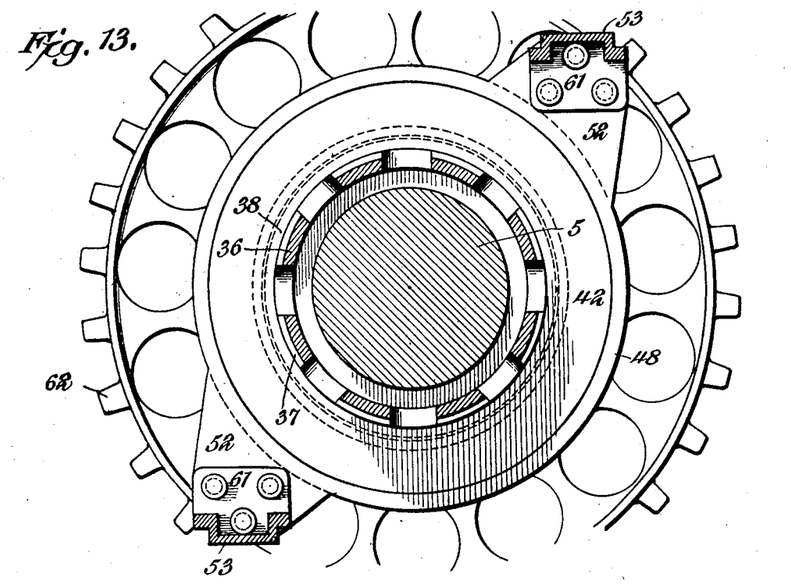
Fig. 13 is an elevation of a sprocket wheel with the hub portion thereof and controlling brackets shown in cross section.

On diametrically opposite sides of the hub 9, or in greater number if the propeller is furnished with more than two blades, are sockets 16, each interiorly screw threaded, as indicated at 17 in Figs. 4 and 7. Screwed into each socket 17 is a stepped sleeve 18 having at one end an exteriorly screw threaded section 19 onto which the threaded end 17 of the socket 16 fits, the outer end of the socket abutting against a circumferential shoulder 20, appearing in Figs. 4, 7 and 18, thus firmly uniting the sleeve 18 with the socket 17. The sleeve 18 tapers from one end toward the other by steps and the smaller end of the sleeve is formed with a circular series of taper pockets 21, each for the reception of a taper roller 22.

Figure 20:
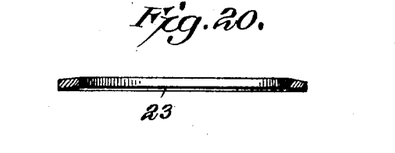
Fig. 20 is a sectional view of a thrust ring.

The circular series of rollers 22 bears upon a taper thrust ring 23 appearing separately in Fig. 20 and also in Figs. 4 and 7.

Figure 15:
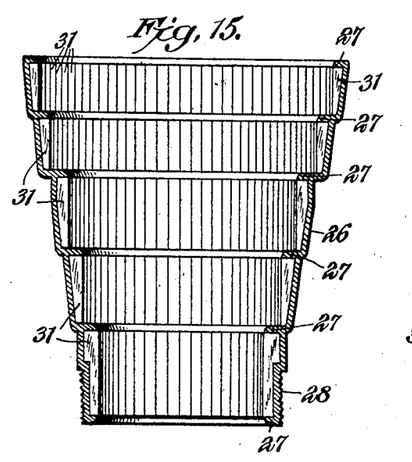
Fig. 15 is a longitudinal section of a taper ferrule for the butt-end of a blade.
Figure 16:
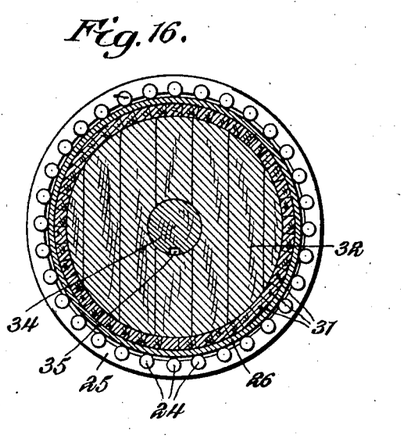
Fig. 16 is a section on the line 16—16 of Fig. 4.
Figure 17:
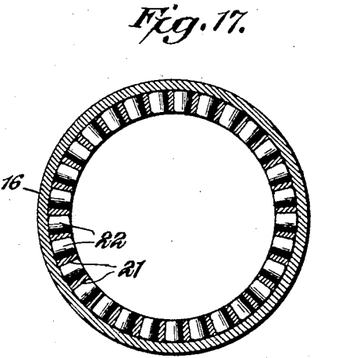
Fig. 17 is a section on the line 17—17 of Fig. 4.
Figure 18:
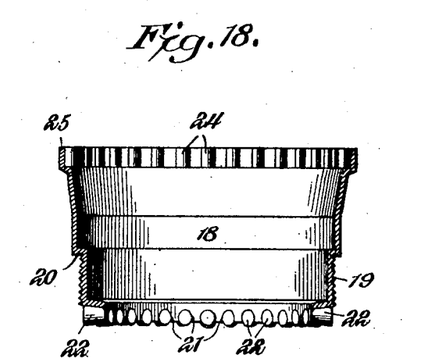
Fig. 18 is a diametric section of the roller thrust and stress sleeve shown in Fig. 17.
Figure 19:
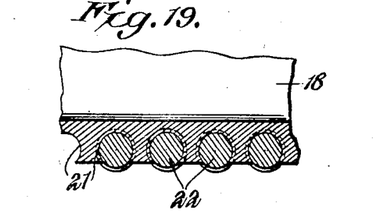
Fig. 19 is a detailed view of the thrust roller bearing in Fig. 18.

At the other or larger end of the sleeve 18 is a circular series of stress rollers 24 shown in Figs. 4, 16 and 18, and having seats in a cage-like edge 25 of the sleeve 18. This provides two circular series of rollers at respectively opposite ends of the sleeve 18, one series being of less diameter than the other series because of the taper form of the sleeve, the larger series of rollers serving as stress rollers to counteract lateral stresses, and the smaller series of rollers constituting thrust rollers. Adapted to enter the sleeve 18 is a ferrule 26, shown separately in Fig. 15 and also shown in association with other parts in Fig. 4.

The ferrule 26, there being one for each propeller blade, is of stepped formation, generally tapering from one end toward the other and provided interiorly with inwardly directed flanges 27 constituting shoulders. The smaller end of the ferrule is exteriorly threaded, as indicated at 28, to receive an interiorly threaded collar 29 with an outwardly directed annular flange 30, constituting a seat for the wear ring 23 against which the thrust rollers 22 bear. The ferrule 26 between each flange 27 and the base of the taper portion next in order toward the small end of the ferrule is provided with a filler 31 which may be made up of numerous small strips of wood fitted tightly in place. The fillers 31 constitute a gluing surface for propeller blades 32, which latter, according to the customary practice, are of laminated construction and made of wood, with the strips glued together and to the wooden fillers, the blades being forced into the ferrules under appropriate pressure, say, about thirty tons.

In order to impart suitable anchoring expansion to the ends of the blades provided with the ferrules 26, each blade is formed with an axial taper bore into which is driven a taper wedge 34, provided with a vent channel 35. The propeller blades 32 are made of sufficient length and appropriate shape for the purpose, following the usual practice in these particulars.

Surrounding the section 5 of the engine shaft 4 is a skeleton sleeve 36 with external screw threads 37, which latter, because of the work imposed upon them, may be of the square type. Mounted on the skeleton screw sleeve 36 is an internally threaded collar 38 which, like the sleeve 36, has square threads. The sleeve 36 has diametrically opposite wings 39 fast thereto and in turn secured by brackets 40, or in any other appropriate manner, to a fixed part of the engine frame, such as shown in 41 in Figs. 3 and 4 and also appearing in other figures, whereby the sleeve 36 is held against rotation.

Figure 14:
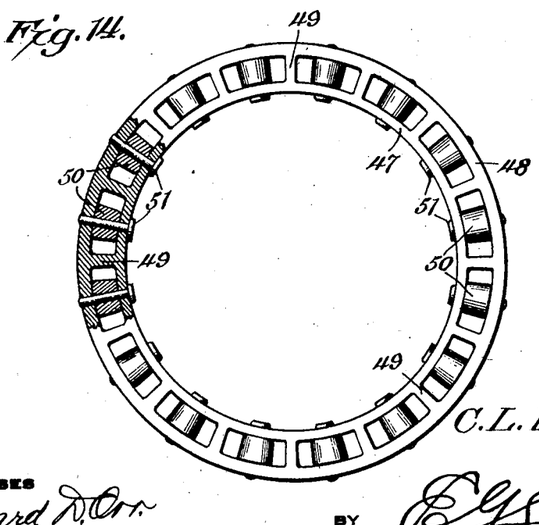
Fig. 14 is an elevation, partly in section, of a roller thrust cage employed in the construction.

The collar 38 has one edge 42 out turned, and carried by and made fast to the collar 38 is a ring 43 with an out turned edge 44 matching and opposite to the edge 42, thereby defining a taper channel 45 between them. The two edges 42 and 44 on their facing portions are provided with wear plates 46, leaving a taper space between them. Seated in the channel 45 is a roller thrust cage 46 shown separately in Fig. 14, and comprising inner and outer rings 47 and 48 respectively with spaced connecting bars 49 between which are lodged rollers 50 in a circular series and held in place by pins 51 traversing the rings 47 and 48. The ring 48 is sufficiently wide to serve as a cover for the channel 45. At suitable intervals, say at diametrically opposite points in the two blade propellers, are radially outwardly extended brackets 52, each having a bar 53 riveted or otherwise securely fast thereto. The bars 53 are channeled to fit between adjacent guides 54 on the sockets 16 carried by the hub 9. The guides 54 are tangentially disposed with respect to the axis of rotation of the propeller.

Fast to each ring 29 within the respective socket 16 is an ear or bracket 55 projecting through a circumferential slot 56 in the peripheral portion of the respective socket 16. There are two ears 55 and slots 56 on opposite sides of the longitudinal axis of the propeller blades and to each ear there is pivoted a link 57, having its other end entering a slot 58 between two ears 59 and formed on one end of the elongated bracket bar 53, provided at the end remote from the ears 59 with an angle extension 61 for attachment of the bracket 53 to the corresponding bracket 52.

Constituting a radial continuation of the outturned edge 44 of the ring 43 is a sprocket wheel 62 engaged by a sprocket chain 63, continued to a sprocket pinion 64 in line with the sprocket wheel 62 and fast on one end of a shaft 65. The shaft 65 is mounted in a journal bearing 66 which may be conveniently supported on the radiator 3 and this shaft where passing through the journal bearing has screw threads 67 formed thereon for an appropriate distance. The shaft 65, which, for the sake of lightness may be hollow, is continued along the body 1 to a position convenient of access to an operator. The shaft 65 is mounted near the rear end of a journal bracket 68 through which the shaft may slide, and fast to the shaft is a bevel pinion 69 carrying a pin 70 extending through an elongated slot 71 in the shaft so that the latter may slide lengthwise with reference to the pinion 69. Meshing with the pinion 69 is another beveled gear wheel or pinion 72 mounted in a suitable bearing 73 carried by an appropriate part of the body 1 and provided with a crank 74 permitting an operator to readily manipulate the pinions 72 and 69, thus rotating the shaft 65. This causes the sprocket chain 63 to rotate the sprocket wheel 62 and thereby rotate the threaded collar 38 to cause it to travel along the threaded sleeve 36 and thus act through the brackets 53 and links 57 upon the propeller blades to rock them in one direction or the other and, thereby, correspondingly varying their pitch. It is understood, of course, that the blades are rocked simultaneously in opposite directions so that the pitch only of the blades is varied. The structure is such that the changing of pitch of the blades does not effect the rotation of the propeller as a whole but the change of pitch varies the action of the propeller upon the air.

What is claimed is:

1. A propeller for airplanes, comprising a hub for receiving the airplane drive shaft, said hub being provided with sockets, a stepped taper sleeve in each socket with the large end of the sleeve outermost, a propeller blade for each socket, and a stepped ferrule for each propeller blade adapted to enter a stepped socket.

2. A propeller for airplanes, comprising a hub with outwardly expanding sockets and a taper sleeve located in each socket with the large end of the sleeve outermost, propeller blades each with a taper butt-end lodged in a taper sleeve, and a ferrule for each propeller blade adapted to enter a corresponding socket.

3. A propeller for airplanes, comprising a hub for receiving the airplane drive shaft, said hub being provided with sockets, a stepped taper sleeve in each socket with the large end of the sleeve outermost, a propeller blade for each socket, and a stepped ferrule for each propeller blade adapted to enter a stepped socket, the stepped sleeve being provided at its larger end with a circular series of anti-friction stress bearings and at the smaller end with a circular series of anti-friction thrust bearings.

4. A propeller for airplanes, comprising a hub for receiving the airplane drive shaft, said hub being provided with sockets, a taper sleeve for each socket with the large end of the sleeve outermost, a propeller blade for each socket, and a ferrule for each propeller blade adapted to enter a corresponding socket, each sleeve having, at its larger end, stress bearings and at the smaller end having thrust bearings.

5. A propeller for airplanes, comprising a hub for receiving the airplane drive shaft, propeller blades for the hub, a stepped ferrule for each blade and carrying the latter, a stepped sleeve for each ferrule, a circular series of anti-friction devices between each end of the sleeve and the ferrule with one series of anti-friction devices resistant to side thrusts and the other series of anti-friction devices resistant to end thrusts between the sleeve and ferrule, and means for holding the blade onto the hub and permitting turning of the blade about its longitudinal axis.

6. A propeller for airplanes, comprising a blade and a taper ferrule for the butt-end of the blade, said ferrule being stepped lengthwise thereof with fillers in the steps and the butt-end of the blade being stepped similarly to the ferrule for seating in the ferrule.

7. A propeller for airplanes, comprising a blade and a taper ferrule for the butt-end of the blades, said ferrule being stepped lengthwise thereof with fillers in the steps, and the butt-end of the blades being stepped similarly to the ferrule for seating in the ferrule, the meeting surfaces of the fillers and the blade being of a fibrous nature to provide gluing surfaces.

8. A propeller for airplanes, comprising a blade and a taper ferrule for the butt-end of the blade, the ferrule being stepped lengthwise thereof with fillers in the steps, and the butt-end of the blade being stepped similarly to the ferrule for seating therein, said ferrule having inturned flanges at the larger end of the steps, and filler blocks confined between the flanges and the basic portion of each step.

9. A propeller for airplanes, comprising a blade with a stepped taper butt-end, and a ferrule inclosing the taper butt-end of the blade, with the ferrule provided with a series of longitudinal spaced inwardly directed flanges, each larger flange overhanging the next flange in order toward the small end of the blade to form circumferential pockets, and fibrous fillers lodged in the pockets to constitute gluing surfaces for the taper butt-end of the blade.

10. A propeller for airplanes, comprising a blade with a stepped taper butt-end, and a ferrule inclosing the taper butt-end of the blade, with the ferrule provided with a series of longitudinally spaced inwardly directed flanges, each larger flange overhanging the next smaller flange in order toward the small end of the blade to form circumferential pockets, and fibrous fillers lodged in the pockets to constitute gluing surfaces for the taper butt-end of the blade, said butt-end of the blade having an axial entering passage and provided with a wedge having a vent opening at the entering end of the passage.

11. A propeller for airplanes, provided with a hub having radial sockets each terminating in an internally threaded extremity, a stepped taper sleeve having internal screw threads engaging the external screw threads of the hub with the sleeve abutting against the outer end of the hub, a blade with a taper stepped ferrule at its inner end entering the sleeve, said ferrule being externally threaded at its small end, and a threaded collar for holding the ferrule to the sleeve.

12. A propeller for airplanes, provided with a hub having radial sockets, each terminating in an internally threaded extremity, a stepped taper sleeve having external screw threads engaging the internal screw threads of the hub with the sleeve abutting against the outer end of the hub, a blade with a taper stepped ferrule at its inner end entering the sleeve, said ferrule being externally threaded at its small end, and a threaded collar for holding the ferrule to the sleeve, the ferrule having means thereon whereby the blade may be rocked about the longitudinal axis of the blade, and means under the control of an operator for effecting such a rocking.

13. In an airplane, a propeller having blades capable of being rocked about axes longitudinal of and individual to the blades, a shaft carrying the propeller, a threaded sleeve surrounding the shaft, a collar threaded onto the sleeve, connections between the collar and the blades and connected to the latter tangentially, and means accessible to an operator for rotating the collar about the threaded sleeve, whereby, to move the collar with the connections lengthwise of the sleeve to cause rocking movements of the blade.

14. In an airplane, propeller blades mounted to rock about an axis substantially perpendicular to the axis of the propeller as a whole, a screw sleeve mounted in the axis of rotation of the propeller and fixed against rotation, a screw collar carried by the sleeve, connections between the screw collar and the blades tangential to the individual axes of rotation thereof, a sprocket wheel carried by the screw collar for rotating the latter, a drive shaft for the sprocket wheel and provided with sprocket chain connections to the sprocket wheel, said shaft having both rotative and longitudinal movements, and means accessible to an operator for rotating the shaft to drive the sprocket wheel.

15. In an airplane, propeller blades mounted to rock about an axis substantially perpendicular to the axis of the propeller as a whole, a screw sleeve mounted in the axis of rotation of the propeller and fixed against rotation, a screw collar carried by the sleeve, connections between the screw collar and the blades tangential to the individual axes of rotation thereof, a sprocket wheel carried by the screw collar for rotation and provided with sprocket chain connections to the sprocket wheel, said shaft having both rotative and longitudinal movements, and means accessible to an operator for rotating the shaft to drive the sprocket wheel, the screw sleeve and connections to the blades having interposed anti-friction connections.

In testimony, that I claim the foregoing as my own, I have hereto affixed my signature.

CLARENCE LYMAN PARKER.